Aug. 6, 1957 R. G. NISLE 2,802,173
CORE SATURATION DISTRIBUTION MEASUREMENT AND APPARATUS THEREFOR
Filed March 1, 1954 3 Sheets-Sheet 1
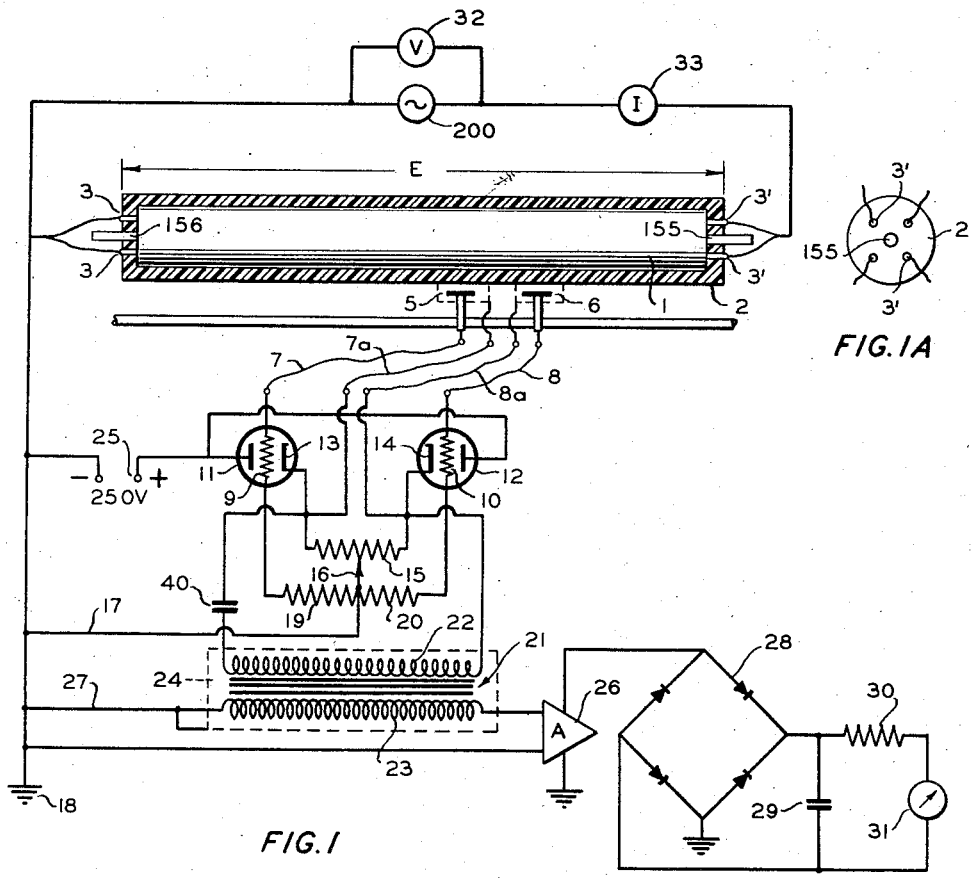
FIG. 1
FIG. 1A
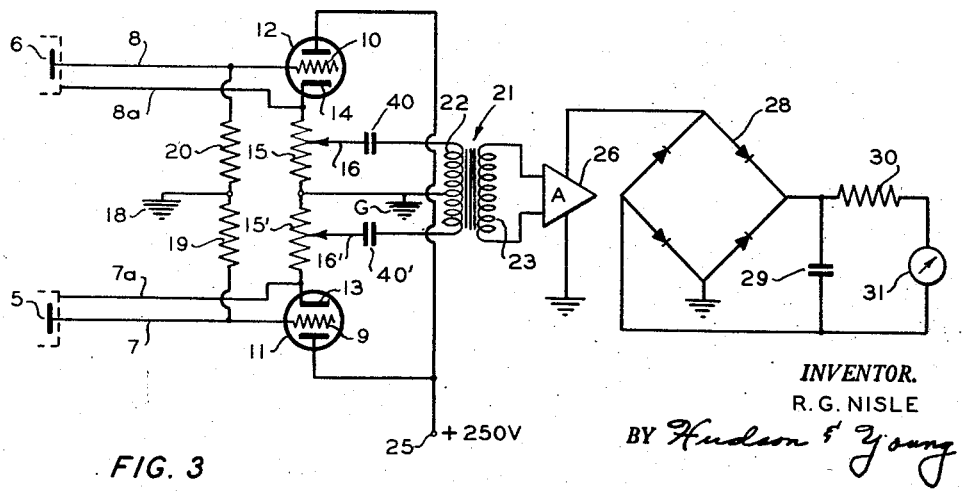
FIG. 3
INVENTOR.
R. G. NISLE
BY Hudson & Young
ATTORNEYS Aug. 6, 1957 R. G. NISLE 2,802,173
CORE SATURATION DISTRIBUTION MEASUREMENT AND APPARATUS THEREFOR
Filed March 1, 1954 3 Sheets-Sheet 2

INVENTOR.
R.G. NISLE
BY *Hudson & Young*
ATTORNEYS

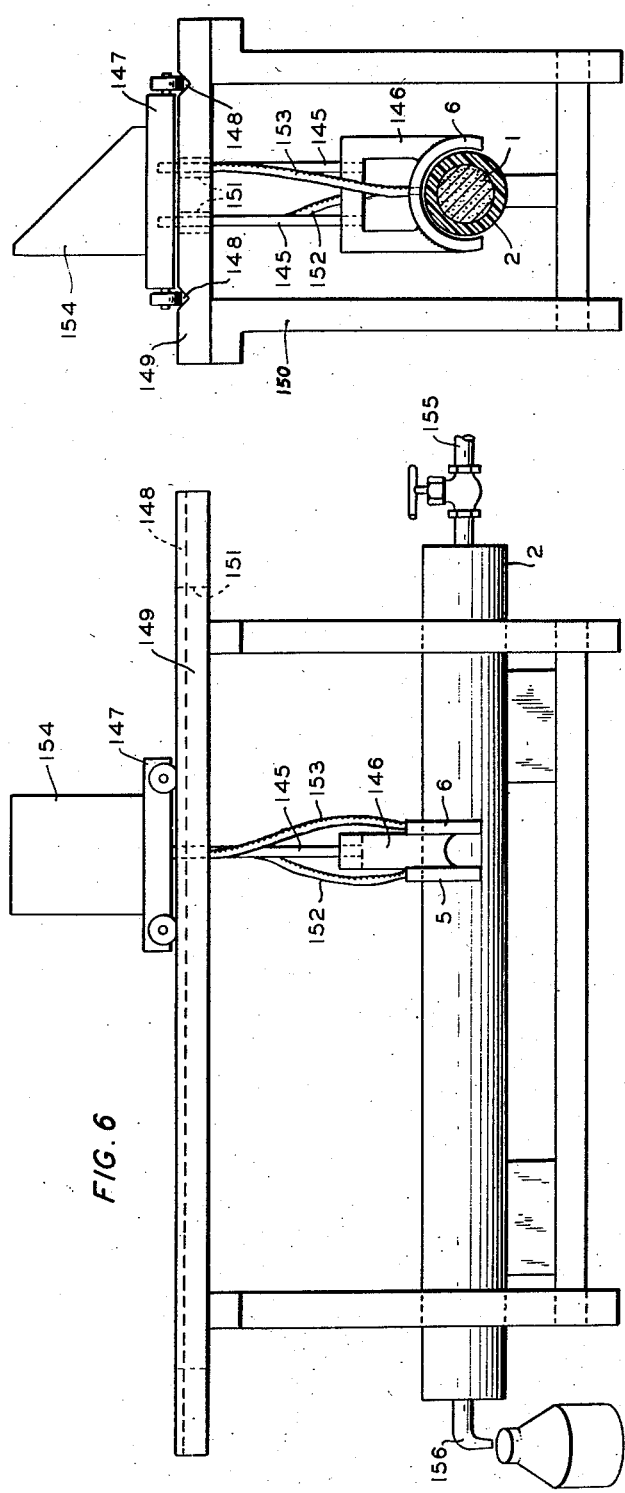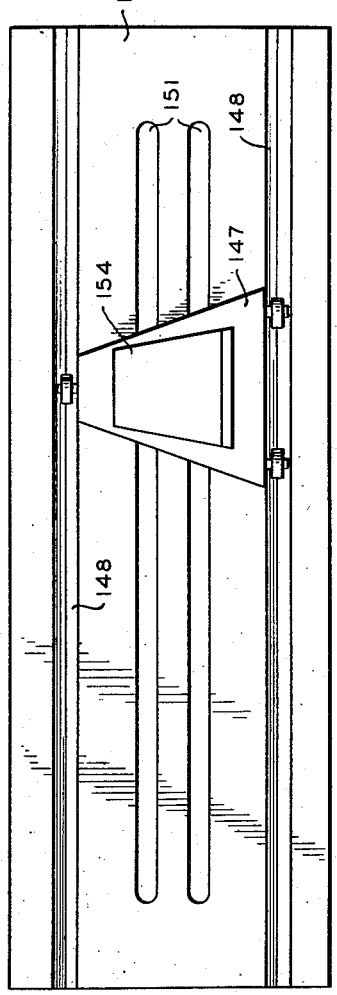

_United States Patent Office_

2,802,173
Patented Aug. 6, 1957

2,802,173

CORE SATURATION DISTRIBUTION MEASUREMENT AND APPARATUS THEREFOR

Robert G. Nisle, Bartlesville, Okla., assignor to Phillips Petroleum Company, a corporation of Delaware Application March 1, 1954, Serial No. 413,371

19 Claims. (Cl. 324—13)

The present invention is directed to an improved means and methods for electrically measuring saturation distribution in a sample of porous material. More specifically, it is directed to a method and means of electrically measuring the saturation distribution of a core from an oil-bearing formation, or a reasonable facsimile of such a core, to determine how the formation will respond to waterflooding.

In the secondary recovery of oil from fields in which the reservoir pressure is no longer sufficient to force the oil to the surface, it is common practice to waterflood the field, forcing the oil to the surface. To determine whether a field is suited to profitable waterflooding, it has been proposed to study samples which duplicate the formation to ascertain how it will react to the displacing action of water.

The principal object of the present invention is the provision of a method and apparatus for the study of porous formations to ascertain their saturation characteristics. A further object is the provision of a method for electrically measuring the saturation distribution, throughout its length, of a substantially completely liquid-saturated core of material obtained from or duplicating an oil-bearing formation. A specific object is the provision of a method and apparatus which permits a core of the type described to be tested at any number of points along its length and the degree of liquid saturation measured at each point, thus permitting the overall linear saturation profile of the core to be accurately plotted. An added object is the provision of an apparatus for measuring the voltage drop between any two sample points on a core of the type described when an alternating current is passed through the core along its axis, and including means for observing the differences between several such readings on a meter, visually.

The present invention is based on the principle that an electrical field exists around a conductor carrying an alternating electrical current. From this it is possible to pick up the voltage at any two points along the conductor by capacitance means, that is, by use of condenser plates placed close to the conductor. The difference in the voltage picked up at any two points can then be measured. By taking a series of voltage measurements along the entire length of the conductor, one can determine variations in the conductivity of the conductor from the variations of the voltage measured at different points along said conductor. Conductivity is the reciprocal of resistivity which in turn is a known constant value for the particular composition of the conductor being tested. Hence, variations in the voltage pickup at regularly spaced points along the conductor are an index of the corresponding variations in the composition of the conductor at those points.

According to the present invention the above principles are used to determine the saturation distribution of fluids within a core from an oil-bearing formation or from one which has been made up to duplicate such a core. The core is saturated with a given liquid and an alternating current passed through the axis of the core. The higher the degree of saturation of the core between any two points on its length the higher the conductivity and the less the resistance to the current flow between said points. By measuring the voltage drop across regularly spaced linear sections of the core, one can compare the corresponding resistances of the several sections to each other according to Ohm's law. Since the voltage drop varies directly with resistance which in turn varies inversely with the degree of saturation of the core, it is obvious that the voltage drops across consecutive linear sections of a core is an accurate index of the degree of saturation of those sections. The saturation profile of the core can therefore be determined. The method is straightforward in theory and accurate to the extent that it accurately measures the voltage drop between the two sampling points.

In theory the ideal manner of studying the fluid saturation characteristics of an underground oil-bearing formation would be to secure horizontal cores from within the formation and to test these in the manner described. In practice, however, it is impossible to secure horizontal cores from vertically drilled wells, only vertical cores, and hence, it is necessary to make up a core which is an accurate reproduction of a horizontal segment of an underground formation. The core should reproduce the reservoir conditions as nearly as possible, with the same porportions of oil and water. A sample of rock is selected which corresponds to that from a given point in the formation and which is oil free; a core is shaped from this. Preferably it is cylindrical in shape, but not necessarily; it could, for example, have a rectangular cross-section. It must be fairly regular and uniform in cross section throughout its length, that is, have a well-defined axis, a line about which the body of the core is symmetrically arranged. The core is evacuated of its air content and the pores then filled with $CO_2$. It is next waterflooded by forcing water in at one end until it emerges from the other end; the $CO_2$, being completely water soluble, permits penetration of the water into all of the pore spaces and hence complete water saturation of the core is effected. The sample is then oil flooded to secure the maximum replacement of the water by oil. This reduces the water content to a minimum, known as the connate water. It is thought that the connate water is trapped in "dead end" or alternative capillaries and its replacement by oil thus prevented. When the water content of the sample has been reduced to this minimum, any section of the core should give a constant reading when tested in the manner described above. The core is now considered to be in its reservoir condition. It is then waterflooded again to drive out all the replaceable oil. During this operation the core is studied according to the method of the invention to observe the velocity and shape of the flood front (the oil-water interface) and the amount of ultimate oil displacement. It may be found, e. g., that the flood front is well-defined; on the other hand it may be diffused over an appreciable length. In studying some formations the water used to flood the core would be brine since one must match the water in the formation.

The novel means for performing the method of this invention comprises broadly an alternating current source, a nonconductive coreholder and a capacitive pickup device with associated amplifying and indicating equipment. The core to be tested is encased in a nonconductive coreholder or housing. Assuming the core to be cylindrical, the housing is a cylindrical sheath or case, preferably of plastic, e. g., lucite. However, any other nonconductive material may be used so long as it is strong enough to withstand the fluid pressure applied to the core. The ends of the coreholder are sealed and electrodes are placed in contact with the ends of the core. An alternating electrical current is then applied to the electrodes, sending an electrical current of the desired frequency through the core. This frequency is low enough to avoid skin effects and high enough to permit capacitance pickup of the voltages at different points along the core housing. (Skin effects may be defined as the tendency of a high frequency current to flow near the surface of the conductor.) Sampling is accomplished externally by means of two capacitance pickup electrodes slidably mounted a fixed distance apart, shaped to fit the external contour of the coreholder, and surrounding approximately ½ to ¾ of the core circumference, thus permitting the electrodes to slide past the coreholder mounting means without interference. As these are moved along the core housing, they pick up the potential at two different points; the signal from each pickup is passed through a comparison circuit wherein it is amplified; the difference between the two signals is resolved, and the resolved signal is rectified, filtered, and applied to an indicating instrument. Unbalance of the signal from the two pickups due to the potential difference between the points of pickup is thus detected and indicated. This potential difference is proportional to the saturation. Thus, the potential difference between any two points is an indication of the average degree of saturation of the core between those two points.

This invention is an advance over known methods for measuring saturation, wherein conducting electrodes are inserted through holes drilled through the plastic core housing and brought into direct contact with the core surface. Such a method is cumbersome in that the space necessary for the pickup equipment puts a practical limit on how closely together the holes can be spaced; it is less accurate because it provides merely point contact with the core as compared with the encircling pickups of the present invention; and it gives poorer resolution and signals because the electrodes are fixed to the points of core contact, not mobile like those of the present invention.

The invention will be illustrated by the accompanying drawings.

Figure 1 shows a schematic arrangement of the core, coreholder, oscillator, pickup means and a comparison circuit employing vacuum tubes.

Figure 1A is an end view of the coreholder of Figure 1, showing 4 electrodes mounted in the end of the holder.

Figure 3 is a variation of the circuit of Figure 1 showing a modification of the potentiometer designed to improve the balancing characteristics of the circuit.

Figure 6 is a side view of the means for supporting the core and moving the pickup electrodes.

Figure 7 is an end view of Figure 6.

Figure 8 is a top or plan view of Figure 6.

Referring to Figure 1, numeral 1 designates a core of porous material to be examined, encased in plastic cylinder or coreholder; 2, having its ends sealed and electrodes indicated at 3, 3' in contact with the ends of the core. A fluid inlet line 155 and a fluid outlet line 156 permit fluid flow through the core. As many electrodes are set around the ends of the core as are believed necessary to spread the applied current fairly uniformly over the core cross-section, e. g., 4 electrodes are shown in Figure 1A. The output from a high frequency audio oscillator 200 at 100-150 volts is applied to the core electrodes, sending an alternating current of the desired frequency through the core. The audio frequency should be from 5 to 15 kilocycles per second, and any commercial type oscillator will do. Capacitance pickups 5, 6 pick up a voltage equivalent to the difference in potential of the core between said pickups.

Figure 2:
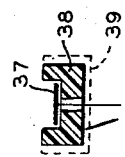
Figure 2 is a cross section of one of the capacitance pickups.

As shown in Figure 2 pickups 5, 6 each consist of a pickup plate electrode 37 in a plastic frame 38 surrounded by a metal shield 39. The pickup electrodes are semicircular in form and surround approximately ½–¾ of the core. While it might be desirable to have the electrodes surround the entire core, this would encounter mechanical difficulties since the coreholder rests on a supporting frame which would block the unrestricted linear movement of circular electrodes along the core. Plastic is used in 38 (Figure 2) and in coreholder 2 because it is nonconductive and will permit capacity type coupling. The metal shield 39 provides protection from line voltage pickup as well as edge pickup between the edges of electrodes 5, 6.

The pickup electrodes are mounted together a fixed distance apart and may be moved back and forth on a track mounted parallel to the core, as illustrated in Figures 6–8, described below. The fixed distance between pickups 5, 6 is approximately ½ the width of the electrodes to provide the best resolution. Obviously, one pickup could be held fixed and the other moved, but it is preferred that the two be spaced a fixed distance apart and both moved together. Otherwise, with one kept stationary and the other moved, each successive reading of the instrument would include the effects included in the earlier reading. For example, if there were a large portion of salt water in the oil at one point in the core, with one electrode held fixed and the other moved, the effects of the portion of salt water would be recorded for all readings.

The signal from the two pcikups is applied through leads 7, 8 to the grids 9, 10 of two amplifying tubes 11, 12 which form a comparison circuit. 250 volts is supplied by a suitable power supply (not shown) to the anodes of vacuum tubes 11 and 12. These tubes are connected as cathode followers, with the cathode 14 connected to one end of the primary 22 of an output transformer 21; the output from cathode 13 is connected to the other end of 22 via condenser 40. The cathodes are grounded at 18 via lead 17 through the wiper 16 of potentiometer 15. Grids 9, 10 are grounded through fixed resistors 19 and 20 via lead 17.

Any difference in potential appearing in the cathodes 13 and 14 also appears in the primary 22 of transformer 21 and in secondary 23. Transformer 21 is shielded by a metal housing 24 or the like to prevent stray pickup such as line voltage and is grounded at 18 through 27. The output potential of secondary 23 is applied to the input of tuned amplifier 26. This is of the commercially available type and therefore is not described. The output of amplifier 26 is applied to a full wave rectifier 28. This is preferably of the dry disc type, but may be of the vacuum tube type. The rectified signal from 28 is filtered by means of an RC filter made up of condenser 29 and resistor 30 before being applied to a direct current indicating instrument 31. Indicator 31 is of the recording type, but a visual indicator may be used.

The shields of the capacitance electrodes 5 and 6 are connected through leads 7a, 8a to the cathodes 13 and 14 of the two amplifying tubes 11 and 12. These shields serve to prevent coupling due to edge effects in the capacitance electrodes 5 and 6 as well as to stray potentials.

Volt meter 32 measures the voltage drop across the core at the frequency of the oscillator and ammeter 33 measures the current flowing through this circuit. These are factors in Ohm's law and hence are used for calibration purposes to determine the resistance of the core. This, in turn, gives an idea of the available resistance per unit length of the core.

Figure 3 shows an alternative circuit for use in carrying out this invention. Vacuum tubes 11 and 12 are connected as cathode followers as in Figure 1. The resistance formerly made up of potentiometer 15 are shown as potentiometers 15 and 15', grounded through a contact between the two at G. The signal from the two vacuum tubes is taken by means of the wipers 16, 16' on potentiometers 15 and 15' and applied by means of capacitances 40, 40' in each lead to the primary winding 22 of transformer 21. In this circuit, the operational characteristics of vacuum tubes 12 and 11 are not changed appreciably when adjustment is made on the potentiometers 15 and 15' since the cathode resistance remains fixed, thus improving the balancing characteristics of the overall circuit as well as maintaining the operational characteristics of the triode tubes fixed, i. e. their operational characteristics are not shifted when an adjustment on the potentiometers is made. The output signal from transformer 21 is taken from secondary winding 23 and amplified by means of amplifier 26. The output of amplifier 26 is rectified by 28, filtered by 29, 30, and applied to indicator 31.

Figure 4:
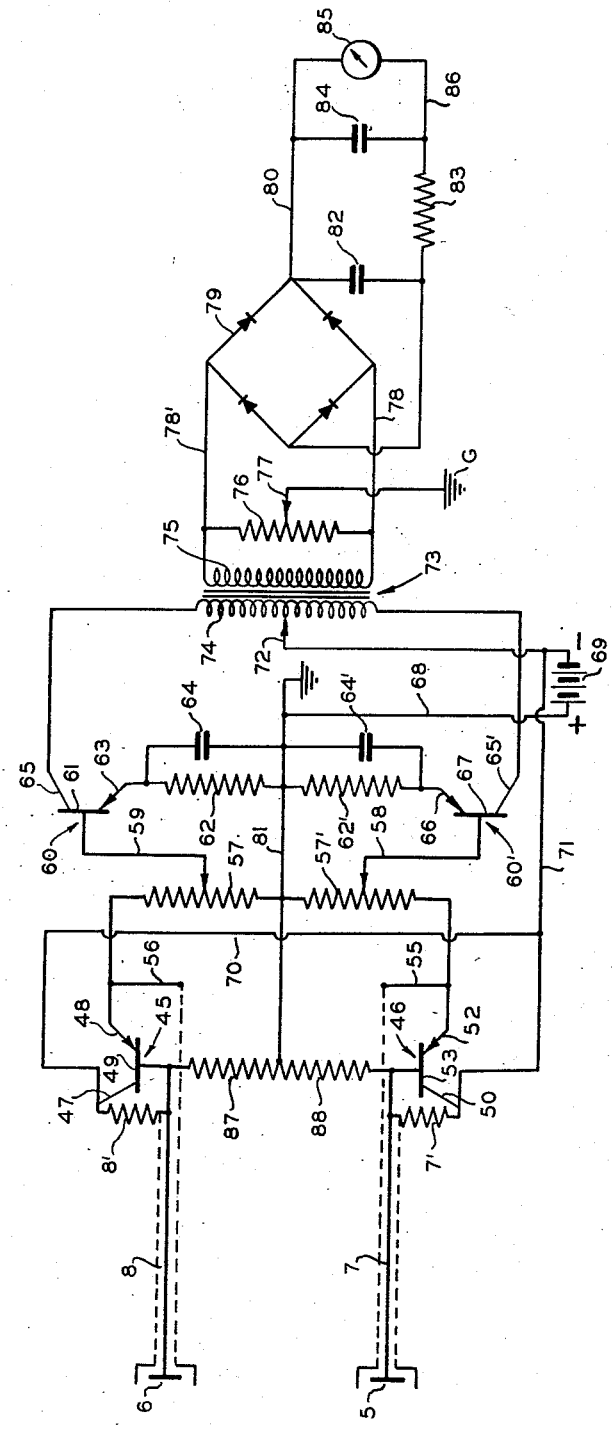
Figure 4 illustrates a further modification of the circuit of Figure 1 employing transistors instead of vacuum tubes.

Figure 4 shows a transistor circuit designed to carry out this invention in place of vacuum tubes. The electrodes 5 and 6 are connected to the bases 49 and 53 of transistors 45 and 46 respectively by leads 8 and 7. The collectors 47 and 50 are connected to the negative terminal of battery 69 by means of leads 70 and 71. Biasing resistors 7' and 8' are connected to collectors 47 and 50 and lead wires 7 and 8 respectively. The bases of transistors 45 and 46 are connected to ground through biasing resistors 87 and 88 respectively. The emitters 48 and 52 are each connected by leads 56 and 55 to the shields surrounding capacitance pickup electrodes 6 and 5, respectively. Transistors 45 and 46 are connected in a circuit commonly known as a grounded emitter circuit. Emitters 48 and 52 are connected to ground through two potentiometers 57 and 57' respectively. The outputs from the two transistors are taken from the wipers on the two potentiometers 57 and 57' by means of leads 59 and 58, respectively, in a manner similar to cathode followers in vacuum tube circuits. By using the potentiometer in the emitter circuits, the operational characteristics of the two transistors are not changed appreciably when the wiper of the potentiometers is moved from one point to the other in establishing balance in the remainder of the circuit to be described. The outputs from transistor 45, 46 are fed through leads 59, 58 to the bases 61, 67 of amplifying transistors 60, 60'. Amplifying transistors 60 and 60' are fed from the outputs of transistors 45 and 46 over leads 59 and 58 respectively. Transistors 60 and 60' are connected in grounded emitter circuits similar to transistors 45 and 46. Emitters 63 and 66 are grounded through resistances 62 and 62' with capacitances 64 and 64' respectively shunting the two resistances. The entire circuit has a common ground through 81. Collectors 65 and 65' are each connected to the terminals of the primary winding 74 of transformer 73. The center tap 72 of primary 74 is connected to the negative side of battery 69. Battery 69 is grounded by means of lead 68. The secondary winding 75 of transformer 73 is shunted by potentiometer 76 center tapped by means of wiper 77 to ground at G. Wiper 77 being adjustable provides the fine adjustment for balancing the output circuit. The output signal from the secondary 75 appears over leads 78 and 78' which are connected to the full-wave rectifier 79, preferably of the dry disk type or vacuum tube type. The rectified potential from 79 is filtered by means of an RC circuit made up of resistance 83, capacitance 82 and capacitance 84. The filtered output signal is applied to indicator 85 over leads 80 and 86. Indicator 85 may be of the recording type.

In operation any difference in signal picked up by capacitance electrodes 5 or 6 is fed to transistors 45 and 46 in a balance circuit. Transistors 45 and 46 serve as impedance matching devices and their output is transmitted to the bases 61 and 67 of transistors 60 and 60' for amplification. The output signal from transistors 60 and 60' appears in the primary 74 of transformer 73. The output signal from transformer 73 is taken from secondary 75, rectified, filtered, and indicated by means of meter 85.

Figure 5:
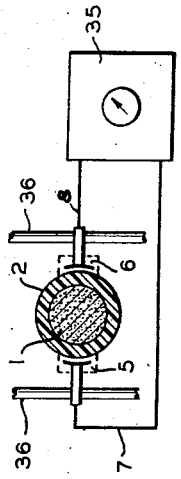
Figure 5 shows an alternative arrangement for detecting and measuring saturation wherein the pickup electrodes are mounted on opposite sides of the coreholder so as to measure the dielectric properties of the core.

Figure 5 illustrates a modification of the invention. Here the pickup electrodes 5 and 6 are semicircular and are mounted facing each other on opposite sides of the coreholder. In taking readings there are moved together along coreholder 2 with an A. C. signal being applied to the plates of the electrodes through conductors 7 and 8 respectively. The combination of core 1 and coreholder 2 serves as a dielectric medium between 5 and 6 and as these are moved any change in the character of the core 1 is reflected as a change in the dielectric properties of the core and are indicated as such in the instrument 35. The A. C. current passes across the core instead of lengthwise through it as in the Figure 1 version. Instrument 35 could be the dielectric constant meter described in S. N. 376,960, "Electrical Measuring Apparatus," by J. R. Parsons, filed August 27, 1953. In this embodiment no separate driver oscillator is required since the high frequency electric source is contained in the device described in that case. Actually, Figure 5 represents a capacity cell with the core forming the dielectric medium between the 2 plates of a condenser and the current flow through the cell is measured by the potential drop across a resistance in series with a capacitance cell.

Figure 6–8 illustrate electrodes 5 and 6 mounted on coreholder 2 and suspended by rods 145 and plastic yoke 146 from conveyor 147. Conveyor 147 is a 3-wheel chassis which travels in grooves 148 cut into the cover plate 149 of support frame 150. Slots 151 permit horizontal movement of rods 145 and cables 152, 153, the latter enclosing leads 7, 7a and 8, 8a respectively. Box 154 rides on conveyor 147 and in the modification shown in the drawing, houses tubes 11, 12 and transformer 24, along with the coupling circuits. The amplifier, rectifier, integrator and indicator are housed in a separate unit (not shown), but suitably connected to box 154. In another modification the vacuum tubes 11, 12 with the leads 7, 7a and 8, 8a may be housed directly adjacent to pickup electrodes 5 and 6, with the remainder of the circuit in the box 154. This shortens the span between the pickup electrodes and the vacuum tubes and, hence, has the advantage of preventing stray pickup along the leads connecting these units.

Inlet line 155 permits the introduction of the desired fluid to one end of core 1 and outlet line 156 permits fluid withdrawal from the other end.

In the operation of the method of this invention using brine as an example of the aqueous liquid in the core the following variables are significant in determining the percent saturation of the core:

$\sigma$=percent saturation of brine, i. e. fraction of pore space filled with brine.
$P$=Porosity of core.
$\rho$=Resistivity of brine in ohm-centimeters.
$A$=Area of core in sq. cm.
$L$=Length of core in cm.
$I$=Current through core in amperes.
$\Delta l$=Element of length along core.
$V$=Applied voltage.
$\varphi$=Instrument reading at point along core.
$V=IR$ R, the resistance, varies directly with the length and resistivity of the core and inversely with its cross-sectional area, porosity, and degree of saturation. Or $$R=\frac{L\rho}{AP\sigma}$$

Substituting this into Ohm's law $$V = I\frac{L\rho}{AP\sigma}$$

Across the full length of the core then, $\sigma$ is the only unknown since V and I can be measured on the voltmeter 32 and ammeter 33 (Figure 1); the core length and cross-sectional area can be measured, and the porosity determined by standard laboratory methods, while resistivity is a constant for the particular liquid.

In determining the percent of saturation $\sigma$, in any linear segment of the core the latter can be considered as divisible into any number of linear segments $\Delta l_1, \Delta l_2 \ldots \Delta l_n$; the voltage drops across these will be $$v_1 + v_2 \ldots v_n = V$$

The voltage across $\Delta l_1$ selected at any point along the core will be $$v_1 = IR_1 = I\frac{\Delta l_1 \rho}{AP\sigma_1}$$

$\varphi_1$ = instrument reading across $\Delta l_1$ this varies with the voltage pickup $\varphi_1 \propto v_1$ $$\varphi_1 = m v_1$$

where $m$ is a constant.

Hence, it can be seen that the degree of saturation of the core across $\Delta l_1$ is a function of the voltage drop across $\Delta l_1$ which in accordance with this invention is a function of the instrument reading.

The above example is in no way to be construed as limiting the invention but rather as one illustration of it, e. g., an instrument could doubtless be devised to read the degree of saturation directly. While brine was used in the example, any other liquid could be used and the same formula applied, changing $\rho$, of course, to the resistivity of the particular liquid.

The above method is an effective way of determining the effectiveness of detergents and other additives in water-flooding since one can compare the characteristics of the flood front, the saturation distribution, etc., with and without the additive, using the same core.

The terms and expressions used in the foregoing specification are terms of description, not limitations, and do not exclude equivalents of the features shown and described, it being recognized that various modifications are possible within the scope of the invention claimed.

I claim:

1. The method of measuring the liquid saturation distribution of a porous material which comprises encasing a generally cylindrical sample of said material substantially saturated with a liquid in a close fitting nonconductive housing, passing an alternating electrical current through the length of said sample, and capacitatively and directly measuring the voltage drop between any two points along the core housing, the said voltage drop varying inversely with the degree of saturation of the core between said two points.

2. The method of measuring the saturation distribution of a porous material which comprises enclosing a generally cylindrical sample of said material substantially saturated with a liquid, in a close fitting nonconductive housing, passing an alternating electrical current lengthwise through said sample, making a series of direct capacitative measurements of the voltage drop between a series of points along the housing, said measurements beginning at one end of the housing and continuing successively to the other end, and electrically converting each of said measured voltage drops to an instrument reading which is a function of the degree of saturation of the core between the points of voltage drop whereby the linear saturation distribution of the sample can be determined.

3. A method of measuring the saturation distribution along a core of porous material which comprises housing said core in a close fitting plastic cylinder, passing lengthwise along said core alternating electrical current of a frequency high enough to permit capacity pickup of the voltage drops between spaced points along the core housing, capacitatively and directly measuring the voltage drops between a series of spaced points along the core housing, resolving these into a series of voltage drops along the length of the core and employing the several voltage drops to determine the saturation distribution of the core, the degree of core saturation at any point being a function of the voltage drop across that point as measured by said pickup.

4. An improved method for measuring the saturation distribution of a liquid-saturated core of porous material encased in a close fitting nonconductive housing comprising passing an alternating electrical current lengthwise through the core, capacitatively picking up the voltage drop between a series of spaced points along the surface of the core housing, whereby the voltage drop between increments of the core length can be measured directly, and electrically converting each of the voltage drops so measured into a reading which is a function of the percent of saturation of the core at the point of measurement, the voltage drop between any two points on the core housing varying with the degree of saturation of the core between those points.

5. The method of measuring the liquid saturation distribution of porous material which comprises encasing in a nonconductive housing an elongated sample of said porous material substantially saturated with a liquid, at least a portion of said liquid being a conductor, passing an alternating electrical current through said sample, capacitatively picking up the voltage at a plurality of points along said sample, whereby the voltage drop between increments of the core length can be measured directly, and electrically converting said voltages to the percent of saturation of the core at the points of voltage pickup whereby variations in the degree of saturation of the core throughout its length can be plotted.

6. Process of claim 5 wherein said liquid comprises oil and brine.

7. The method of measuring the saturation distribution of a core of porous material comprising enclosing said core in a close fitting nonconductive housing, passing an alternating current lengthwise through the core, capacitatively picking up signals at a number of points along the electrical field surrounding said core, said signals being picked up in pairs beginning at one end of the core and continuing to the other end, the two points of origin of each pair of signals being the same distance apart on a line parallel to the path of the current through said core, resolving the difference between the two signals constituting each pair, said difference being a measure of the voltage drop between said two points, and electrically converting this voltage drop to the average degree of saturation of the core between said two points, the voltage drop between any two points along the electrical field varying inversely with the average degree of saturation of the core between said points.

8. In a system for electrically measuring the saturation distribution in a sample of porous material, in combination; a close fitting elongated generally cylindrical nonconductive housing enclosing and closely fitting a core sample of porous material, means for passing an alternating electrical current lengthwise through the core sample, means for capacitatively picking up the voltage at a plurality of points spaced along the core housing and means for electrically converting the voltage drop measured between any two points along the core into an instrument reading which is a function of the saturation of the core between said two points.

9. In a system for electrically measuring the saturation distribution of a sample of porous material, in combination; an elongated generally cylindrical nonconductive housing enclosing a core sample of porous material, a pair of capacitance pickup electrodes slidably mounted a fixed distance apart on said core housing, a device connected to said electrodes for measuring the voltage drop between them as they are moved together along the core housing, and means for electrically converting the individual voltage drops thus measured into instrument readings which are a function of the degree of saturation of the core between said electrodes.

10. In a system for electrically measuring the saturation distribution of a sample of porous material, in combination; an elongated generally cylindrical nonconductive housing enclosing a core sample of porous material, a pair of capacitance pickup electrodes slidably mounted a fixed distance apart on said core housing, a pair of amplifying tubes connected as cathode followers with said electrodes, an amplifier, means for inductively coupling the output from the cathodes to said amplifier, and means for electrically converting the resulting amplified signal into an instrument reading which is a function of the degree of saturation of the core between the electrodes.

11. In a system for electrically measuring the character of a sample of porous material, in combination; an elongated nonconductive housing enclosing a generally cylindrical sample of said material, means for passing an alternating electrical current lengthwise through said sample, a pair of capacitance pickup electrodes slidably mounted on said housing and designed to pick up the voltage drop between any number of pairs of points along said core housing, a pair of triodes connected as cathode followers with said electrodes, means coupling the first of said electrodes to the grid of the first triode, means coupling the second of said electrodes to the grid of the second triode, and means responsive to the voltage change in the grid circuits arranged to indicate the voltage drop between the electrodes and to electrically convert said voltage drop to the percent of saturation of the core between said electrodes.

12. In a system for electrically measuring the saturation distribution of a sample of porous material, in combination, a nonconductive housing enclosing a core sample of said material, a pair of electrically shielded capacitance pickup electrodes slidably mounted a fixed distance apart on said housing, means for passing an alternating electrical current through said core from one end to the other, a pair of vacuum tubes each having a cathode, anode and a control grid, each of said grids being connected with one of said electrodes, means connecting the electrode shields to the cathode of said vacuum tubes, means for supplying sufficient operating potential to said tubes, the outputs from the two vacuum tubes being taken from the cathodes, and an indicating instrument to which said outputs are inductively coupled.

13. In a system for electrically measuring the saturation distribution of a sample of porous material, in combination, a nonconductive housing enclosing a core sample of said material, a pair of electrically shielded capacitance pickup electrodes slidably mounted a fixed distance apart on said housing, means for passing an alternating electrical current through the axis of said core, a pair of vacuum tubes each having a cathode, anode and a control grid, each of said grids being connected with one of said electrodes, means supplying sufficient operating potential to said vacuum tubes, means connecting the electrode shields to the cathodes of the vacuum tubes, the outputs from said vacuum tubes being taken from the cathodes, an amplifier to which said outputs are inductively coupled, a rectifier, a filter and an indicating instrument, the signal from the amplifier passing through the latter units in the order recited.

14. In a system for electrically measuring the saturation distribution of a sample of porous material, in combination, a nonconductive housing enclosing a core sample of said material, means for passing an alternating electrical current along the axis of said core, a first pair of electrically shielded capacitance pickup electrodes slidably mounted a fixed distance apart on said housing, a first pair of transistors, each having a base, a collector and an emitter connected in a grounded emitter circuit having a potentiometer between the emitter and ground, said pickup electrodes being connected to the base of said transistors, means supplying said transistors with sufficient operating potential, the output from said transistors being taken from said potentiometers, a second pair of transistors each having a base, collector and an emitter connected to a grounded emitter circuit, the output from said first pair of transistors being taken from said potentiometer and amplified by means of said second pair of transistors, and an indicating instrument to which the outputs taken from the collectors of said second pair of transistors are inductively coupled.

15. The combination of claim 14 comprising, in addition, mans connecting the electrical shields of said electrodes to the emitter of said first pair of transistors.

16. In a system for electrically measuring the saturation distribution of a sample of porous material, in combination, a nonconductive housing enclosing a core sample of said material, means for passing an alternating electrical current through said core from one end to the other, a pair of electrically shielded capacitance pickup electrodes slidably mounted a fixed distance apart on said housing, a pair of vaccum tubes each having a cathode, anode and a control grid, said grids being connected to said electrodes, a pair of potentiometers through which said cathodes are connected to ground, and an indicating instrument through which the outputs from said potentiometers are inductively coupled.

17. The combination of claim 16 comprising, in addition, means connecting the electrode shields to the cathodes of said vacuum tubes.

18. In a system for electrically measuring saturation distribution of a sample of porous material, in combination, a nonconductive housing enclosing a core sample of said material, means for passing an alternating electrical current through said core from one end to the other, a pair of electrically shielded capacitance pickup electrodes slidably mounted a fixed distance apart on said housing, a pair of vacuum tubes each having a cathode, anode and a control grid, said pair of electrodes being connected to the grids of said vacuum tubes, a pair of potentiometers through which said cathodes are connected to ground, an amplifier through which outputs are inductively coupled, a shield surrounding said inductive coupling and connected to ground, a rectifier, a filter and an indicating instrument, the signal from the amplifier passing through the latter units in the order recited.

19. The combination of claim 18 comprising, in addition, means connecting the electrode shields to the cathodes of said vacuum tubes.

References Cited in the file of this patent

UNITED STATES PATENTS

| 1,745,419 | Henneberger | Feb. 4, 1930 |
| 2,368,119 | De Lanty et al. | Jan. 30, 1945 |
| 2,613,250 | Bilhartz et al. | Oct. 7, 1952 |